United States Patent
Xi et al.

(10) Patent No.: US 6,456,901 B1
(45) Date of Patent: Sep. 24, 2002

(54) HYBRID ROBOT MOTION TASK LEVEL CONTROL SYSTEM

(76) Inventors: Ning Xi, 4132 Breakwater Dr., Okemos, MI (US) 48864; Jindong Tan, 1527 Spartan Village, Apt, K, East Lansing, MI (US) 48823

(*) Notice: Subject to any disclaimer, the term of this patent is extended or adjusted under 35 U.S.C. 154(b) by 0 days.

(21) Appl. No.: 09/838,894

(22) Filed: Apr. 20, 2001

(51) Int. Cl.[7] .............................................. G06F 19/00

(52) U.S. Cl. ........................... 700/245; 700/29; 700/31; 700/59; 700/63; 700/250; 700/258; 700/260; 700/261; 700/262; 700/263; 700/264; 318/568.17; 318/572; 318/578; 901/6; 901/9; 901/33; 901/34; 901/35; 901/41; 701/23

(58) Field of Search ................................. 700/245, 258, 700/260, 250, 263, 29, 31, 59, 63, 261, 262, 264; 318/568.17, 572, 578; 901/9, 6, 33, 34, 35, 41, 46; 701/23

(56) References Cited

U.S. PATENT DOCUMENTS

| | | | |
|---|---|---|---|
| 36,929 A | | 11/1862 | Workman |
| 4,356,440 A | * | 10/1982 | Curtiss et al. |
| 4,621,332 A | * | 11/1986 | Sugimoto et al. |
| 4,987,356 A | * | 1/1991 | Yamada et al. |
| 5,265,295 A | * | 11/1993 | Jinno et al. |
| 5,276,390 A | | 1/1994 | Fisher et al. |
| 5,442,269 A | | 8/1995 | Takayama et al. |
| 5,509,847 A | * | 4/1996 | Jinno et al. |
| 5,579,442 A | | 11/1996 | Kimoto et al. |
| 5,590,034 A | | 12/1996 | Snell |
| 5,646,493 A | | 7/1997 | Hara et al. |
| 5,880,956 A | | 3/1999 | Graf |
| 6,039,290 A | | 3/2000 | Wie et al. |
| 6,067,862 A | * | 5/2000 | Murray et al. ............... 700/264 |
| 6,092,004 A | | 7/2000 | Harima |
| 6,181,983 B1 | | 1/2001 | Schlemmer et al. |
| 6,204,620 B1 | | 3/2001 | McGee et al. |
| 6,278,906 B1 | * | 8/2001 | Piepmeier et al. .......... 700/250 |

OTHER PUBLICATIONS

Osumi et al., Cooperative control of two industrial robots with force control devices, 1995, IEEE, pp. 550–555.*
Egeland et al., A note Lyapunov stability for an adaptive robot controller, 1994, IEEE, pp. 1671–1673.*
Fjellstad et al., Singularity–free tracking of unmanned underwater vehicles in 6 DOF, 1994, IEEE, pp. 1128–1133.*
Osumi et al., Cooperative control between multiple manipulators with flexibility, 1993, IEEE, pp. 1935–1940.*
A. K. Bejczy, S. Lee, "Robot Arm Dynamic Model Reduction for Control," Proceedings of IEEE Conference on Decision and Control, San Antonio, Tex, pp. 1466–1476, 1983.

(List continued on next page.)

Primary Examiner—William A. Cuchlinski, Jr.
Assistant Examiner—McDieunel Marc
(74) Attorney, Agent, or Firm—Monte L. Falcoff (57) ABSTRACT

A hybrid control system is provided for controlling the movement of a robot. The hybrid control system includes a singularity detector; a task level controller that receives a motion plan and determines a first set of control commands which are defined in a task space; and a joint level controller that receives the motion plan and determines a second set of control commands which are defined in a joint space. The singularity detector monitors the movement of the robot and detects robot movement in a region about a singularity configuration. When robot movement occurs outside of this region, the task level controller is operable to issue the first set of control commands to the robot. When the robot movement occurs inside of this region, the joint level controller is operable to issue the second set of control commands to the robot. In this way, the hybrid control system ensures feasible robot motion in the neighborhood of and at kinematic singularity configuration.

20 Claims, 3 Drawing Sheets-

OTHER PUBLICATIONS

B. E. Bishop, M. W. Spong, "Control of Redundant Manipulators Using Logic–Based Switching," Proceedings of IEEE Conference on Decision and Control, Leuven, Belgium, pp2664–2669, May 1998.

M. S. Branicky, "Multiple Lyapunov Functions and Other Analysis Tools for Switched and Hybrid Systems," IEEE Transactions on Automatic Control, vol. 43, No. 4, 1998, pp. 475–482.

F. Cheng, T. Hour, Y. Sun, T. H. Chen, "Study and Rosolution of Singularities for a 6 DOF PUMA Manipulators," IEEE Transactions on systems, Man and Cybernetics B: Cybernetics, vol.27, No.2, Apr. 1997, pp. 332–343.

S. Chiaverini, B. Siciliano, O. Egeland, "Review of the Damped Least–Squares Inverse Kinematics with Experiments on an Industrial Robot Manipulator," IEEE Trans. Control System Technology, vol.2, No.2, Jun. 1994, pp. 123–134.

Fabrizio Caccavale, Setfano Chiaverini, and Bruno Siciliano, "Second–Order Kinematic Control of Robot Manipulators with Jacobian Damped Least–Squares Inverse: Theory and Experiments," IEEE/ASME Transactions on Mechatronics, vol.2, No.3, Sep., 1997, pp. 188–194.

J. Kieffer, "Manipulator Inverse Kinematics for Untimed End–Effector Trajectories With Ordinary Singularities," The International Journal of Robotics Research, vol., 11, Jun. 1992, pp. 225–237.

J. Kieffer, "Differential Analysis of Bifurcations and Isolated Singualarities for Robots and Mechanisms," IEEE Transactions on Robotics and Automations, vol.10, No.1, Feb. 1994, pp1–10.

M. Kircanski, N. Kircanshi, D. Lekovic, M. Vukobratovic, "An Experimental Study of Resolved Acceleration Control of Robots at Singularities: Damped Least–Squares Approach," Journal of Dynamic Systems, Measurement, and Control, vol.119, Mar., 1997, pp. 97–101.

Y. Nakamura, H. Hanafusa, "Inverse Kinematic Solutions With Singularity Robustness for Robot Manipulator Control," Journal of Dynamic Systems, Measurement, and Control, vol. 108, Sep., 1986, pp. 163–171.

D.N. Nenchev, M. Uchiyama, "Singularity–Consistent Path Tracking: A Null Space Based Approach," International Journal of Robotics Research, vol.14, No.4, 1995, pp. 399–404.

K. O'Neil, Y. C. Chen, "Instability of Pseudoinverse Acceleration Control of Redundant Mechanisms", Proceedings of IEEE International Conference on Robotics and Automation, San Francisco, Apr. 2000, pp. 2575–2582.

P. Peleties, R. A. Decarlo, "Asymptotic Stability of m–switched Systems Using Lyapunov–like Functions," Proceeding of American Control Conference, 1991, pp. 1679–1684.

M. Sampei and K. Furuata, "Robot Control in the Neighborhood of Singular Points," IEEE Journal Robotics and Automation, vol. 14, No. 3, Jun. 1988, pp. 303–309.

T. J. Tarn, A. K. Bejczy, G. T. Marth, A. K. Ramadorai, "Performance Comparison of Four Manipulator Servo Schemes," IEEE Control Systems Magazine vol. 13, Feb. 1993, pp. 22–29.

Krzysztof Tochon, "Calibration of Manipulator Kinematics: A Singularity Theory Approach", IEEE Transactions on Robotics and Automation, vol. 8, No. 5, Oct. 1992, pp. 671–678.

Krzysztof Tochon, "A Normal Form of Singular Kinematics of Robot Manipulators with Smallest Degeneracy", IEEE Transactions on Robotics and Automation, vol. 11, No. 3, Jun. 1995, pp. 401–404.

Krzysztof Tochon, "Quadratic Normal Forms of Redundant Robot Kinematics with Application to Singularity Avoidance", IEEE Transactions on Robotics and Automation, vol. 14, No. 5, Oct. 1998, pp. 834–387.

Krzysztof Tochon, R. Muszynski, "Singular Inverse Kinematic Problem for Robotic Manipulators: A Normal Form Approach," IEEE Transactions on Robotics and Automation, vol. 14, No. 1, Oct. 1998, pp. 93–104.

Tzyh–Jong Tarn, Yunying Wu, Xing Xi, A. Isidori, "Force Regulation and Contact Transition Control," IEEE Control Systems Magazine, vol. 16, Feb. 1996, pp. 32–40.

* cited by examiner

HYBRID ROBOT MOTION TASK LEVEL CONTROL SYSTEM

BACKGROUND OF THE INVENTION

The present invention relates generally to robot controllers and, more particularly, a hybrid control system for controlling the movement of a robot in the neighbor of and at kinematic singular configurations.

A robot task is usually described in its task space. The direct implementation of a task level controller can provide significant application efficiency and flexibility to a robotic operation. Implementation of the task level controller becomes even more important when robots are working coordinately with humans. The human intuition on a task is always represented in the task space. However, the major problem in the application of the task level controller is the existence of kinematic singularities. While approaching a singular configuration, the task level controller generates high joint torques which result in instability or large errors in task space. The task level controller is not only invalid at the singular configuration, but also unstable in the neighborhood of the singular configuration. Therefore, a myriad of methods have been proposed to solve this problem.

For instance, the Singularity-Robust Inverse (SRI) method was developed to provide an approximate solution to the inverse kinematics problem around singular configurations. Since the Jacobian matrix becomes ill-conditioned around the singular configurations, the inverse or pseudo-inverse of the Jacobian matrix results in unreasonable torques being applied by a task level controller. Instead, the SRI method uses a damped least-squares approach (DLS) to provide approximate motion close to the desired Cartesian trajectory path. The basic DLS approach has been refined by varying the damping factors to improve tracking errors from the desired trajectory path. By considering the velocity and acceleration variables, the SRI method can be further improved to reduce the torque applied to individual joints and achieve approximate motion. By allowing an error in the motion, the SRI method allows the robot to pass close to, but not go through a singularity point. It can be shown that such a system is unstable at the singular points. This means that robot movement can not start from or can not actually reach the singularity points. Obviously, this creates difficulties for many robot applications.

In another instance, a path tracking approach augments the joint space by adding virtual joints to the manipulator and allowing self motion. Based on the predictor-corrector method of path following, this approach provides a satisfactory solution to the path tracking problem at singular configurations. Timing is not considered at the time of planning and it is reparameterized in solving the problem. However, when a timing is imposed on the path, it forces the manipulator to slow down in the neighborhood of singular configurations and to stop at the singular configuration.

The normal form approach provides a solution of inverse kinematics in the entire joint space. With appropriately constructed local diffeomorphic coordinate changes around the singularity, the solution of inverse kinematics can be found and then transformed back to the original coordinates. All joint space solutions are obtained by gluing together the regular and the singular piece. The normal form method is heavily computationally involved. In addition, it is experimentally difficult to implement it in real-time.

Finally, a time re-scale transformation method for designing robot controllers also incorporates the dynamic poles of the system. This method achieves slow poles in the vicinity of a singularity configuration and fast poles in the regular area. It can be shown that this method results in similar error dynamics as found in the SRI method.

Therefore, it is desirable to design a hybrid robot motion control system which is stable in the entire robot workspace including at the singularity configurations. Based on the analysis of the singular configurations of nonredundant robot manipulators, the robot workspace is divided into subspaces by the singularity configurations. In different subspaces, different continuous robot controllers could be used. A hybrid system approach is used to integrate different continuous robot controllers and singularity conditions are adopted as switching conditions for discrete control. With the hybrid motion control system, a robot can pass by singular configurations and achieve a stable and continuous motion in the entire workspace.

SUMMARY OF THE INVENTION

In accordance with the present invention, a hybrid control system is provided for controlling the movement of a robot. The hybrid control system includes a singularity detector; a task level controller that receives a motion plan and determines a first set of control commands which are defined in a task space; and a joint level controller that receives the motion plan and determines a second set of control commands which are defined in a joint space. The singularity detector monitors the movement of the robot and detects robot movement in a region about a singularity configuration. When robot movement occurs outside of this region, the task level controller is operable to issue the first set of control commands to the robot. When the robot movement occurs inside of this region, the joint level controller is operable to issue the second set of control commands to the robot. In this way, the hybrid control system of the present invention ensures feasible robot motion in the neighborhood of and at kinematic singularity configuration.

For a more complete understanding of the invention, its objects and advantages, reference may be had to the following specification and to the accompanying drawings.

DESCRIPTION OF THE PREFERRED EMBODIMENT

Figure 1:
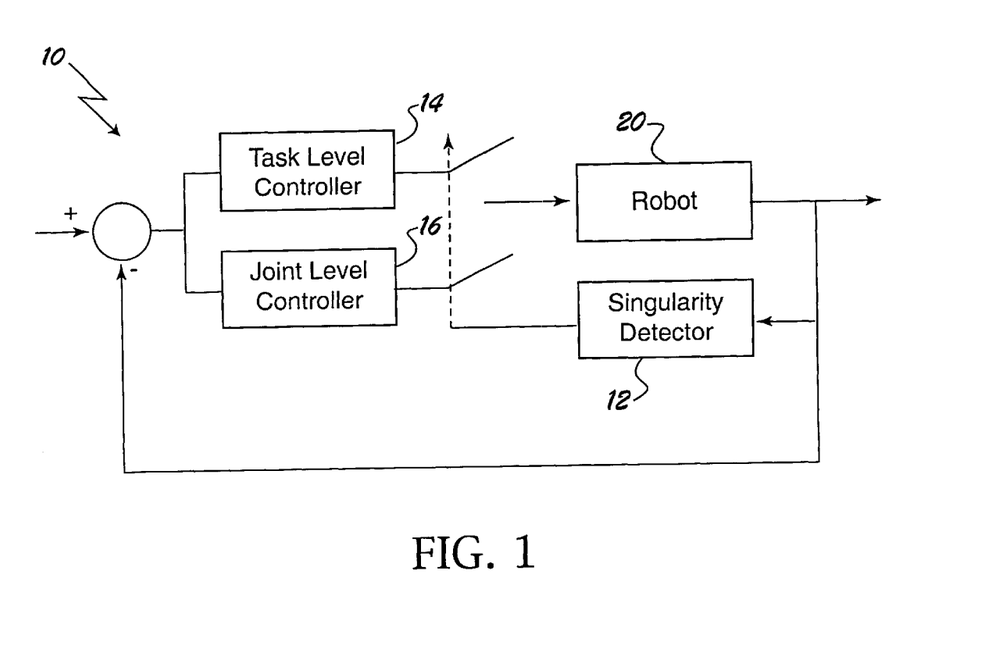
FIG. 1 is a block diagram of a hybrid motion control system in accordance with the present invention.

A hybrid control system 10 for controlling the movement of a robot 20 is shown in FIG. 1. The hybrid control system generally includes a singularity detector 12, a task level controller 14, and a joint level controller 16. In operation, a motion plan (or trajectory plan) is received by the task level controller 14 and the joint level controller 16. In response to the motion plan, the task level controller 14 determines a first set of control commands which are defined in a task space; whereas the joint level controller 16 determines a second set of control commands which are defined in a joint space.

The singularity detector 12 monitors the movement of the robot 20 and detects robot movement in a region about a singularity condition. When robot movement occurs outside of this region, the task level controller 14 is operable to issue the first set of control commands to the robot 20. When the robot movement occurs inside of this region, the joint level controller 16 is operable to issue the second set of control commands to the robot 20. In this way, the hybrid control system 10 of the present invention ensures feasible robot motion in the neighborhood of and at kinematic singularity conditions. A more detailed description for the hybrid control system 10 of the present invention is provided below.

The dynamic model for a nonredundant robot arm can be written as $$D(q)\ddot{q}+c(q,\dot{q})+g(q)=u$$

where q is the 6×1 vector of joint displacements, u is the 6×1 vector of applied torques, D(q) is the 6×6 positive definite manipulator inertia matrix, c(q,q̇) is the 6×1 centripetal and coroilis terms, and g(q) is the 6×1 vector of gravity term.

For a robot task given in joint space, denoted by $q^d, \dot{q}^d, \ddot{q}^d$ a joint level robot controller in joint space can be derived by $$u_1=D(q)(\ddot{q}^d+K_{V_q}(\dot{q}^d-\dot{q})+K_{P_q}(q^d-q))+c(q,\dot{q})+g(q) \quad (1.1)$$

where $K_{V_q}$ and $K_{P_q}$ are feedback gain matrices. Given $e_{q1}=q^d-q, e_{q2}=\dot{q}^d-\dot{q}$, the error dynamics for this controller can be described by $$\dot{e}_{q1}=e_{q2}$$

$$\dot{e}_{q2}=-K_{P_q}e_{q1}-K_{V_q}e_{q2}.$$

It is straightforward to show that this system is asymptotically stable for appropriate gain matrices $K_{P_q}, K_{V_q}$. Regardless of the current robot configuration, the system can track any reasonable trajectories given as $q^d, \dot{q}^d, \ddot{q}^d$.

However, a robot task is generally represented by desired end-effector position and orientation. Therefore, it is desirable to provide a robot controller that operates in task space. To develop a task level controller, the above dynamic robot model needs to be represented in the form of task level variables. Let $Y \in \Re^6$ be a task space vector defined by $Y=(x,y,z,O,A,T)^T$, where $(x,y,z)^T$ denotes the position of the end-effector and $(O,A,T)^T$ denotes an orientation representation (Orientation, Attitude, Tool angles) of the end-effector in the task space. The relationship between the joint space variable q and task space variable Y can be represented by Y=h(q). Accordingly, the dynamic robot model in the form of task space variables can then be described as follows:

$$DJ_o^{-1}(\ddot{Y}-\dot{J}_o\dot{q})+c(q,\dot{q})+g(q)=u \quad (1.2)$$

where $J_o$ is called the OAT Jacobian matrix and $\dot{Y}=J_o\dot{q}$. Given a desired path in task space, $Y^d, \dot{Y}^d, \ddot{Y}^d$, the task level robot controller in task space can be described by $$u_2=DJ_o^{-1}(\ddot{Y}^d-\dot{J}_o\dot{q}+K_{Vx}e_{x2}+K_{Px}e_{x1})+c(q,\dot{q})+g(q) \quad (1.3)$$

where $e_{x1}=Y^d-Y$ and $e_{x2}=\dot{Y}^d-\dot{Y}$. Accordingly, the error dynamics in task space can be described as $\dot{e}_{x1}=e_{x2}$ and $\dot{e}=-K_{Px}e_{x1}-K_{Vx}e_{x2}$. It can also be shown that this system is locally asymptotically stable for appropriate gain matrices $K_{Px}, K_{Vx}$.

A comparison of the joint level controller and the task level controller shows that the operation of the task level controller depends on the existence of $J_o^{-1}$ whereas the joint level controller does not. If the determinant of $J_o$ is very small or zero, then the determinant of $J_o^{-1}$ could be very large which in turn will result in very large joint torques. Robot configurations where $\det(J_o)=0$ are referred to as singular configurations. Robot singular configurations and their corresponding analytical singularity conditions are therefore obtained based on an analysis of the Jacobian matrix.

For a six degrees of freedom robot manipulator having a three degrees of freedom forearm and a three degrees of freedom spherical wrist, the Jacobian matrix, $J_o$, is a 6×6 matrix. While the following description is provided with reference to a six degrees of freedom robot manipulator, it is readily understood that the present invention is applicable to other types of robot manipulators.

With regards to the six degrees of freedom manipulator, the Jacobian matrix may be decoupled in such a way that the singular configurations resulting from arm joint angles and wrist joint angles are separated. As will be apparent to one skilled in the art, the Jacobian matrix, $J_o$, could be decoupled into:

$$J_o = \begin{bmatrix} I & U \\ 0 & I \end{bmatrix}\begin{bmatrix} I & 0 \\ 0 & \Psi \end{bmatrix}\begin{bmatrix} J_{11} & 0 \\ J_{21} & J_{22} \end{bmatrix}$$

$$= \begin{bmatrix} I & U \\ 0 & I \end{bmatrix}\begin{bmatrix} I & 0 \\ 0 & \Psi \end{bmatrix}J_w$$

$$J_w\begin{bmatrix} J_{11} & 0 \\ J_{21} & J_{22} \end{bmatrix}, \Psi = \begin{bmatrix} -\frac{s_o s_A}{c_A} & \frac{c_o s_A}{c_A} & 1 \\ -c_o & -s_o & 0 \\ -\frac{s_o}{c_A} & \frac{c_o}{c_A} & 0 \end{bmatrix}, U = \begin{bmatrix} 0 & d_6\cdot e_k & -d_6\cdot e_j \\ -d_6\cdot e_k & 0 & d_6\cdot e_i \\ d_6\cdot e_j & -d_6\cdot e_i & 0 \end{bmatrix},$$

$$J_{11} = \begin{bmatrix} -d_4 s_1 s_{23} - a_1 s_1 c_2 - a_3 s_1 c_{23} - d_2 c_1 & d_4 c_1 c_{23} - a_2 c_1 s_2 - a_3 c_1 s_{23} & c_1(d_4 c_{23} - a_3 s_{23}) \\ d_4 c_1 s_{23} + a_1 c_1 c_2 + a_3 c_1 c_{23} - d_2 s_1 & d_4 s_1 c_{23} - a_2 s_1 s_2 - a_3 s_1 s_{23} & s_1(d_4 c_{23} - a_3 s_{23}) \\ 0 & -d_4 s_{23} - a_2 - a_3 c_{23} & -d_4 s_{23} - a_3 c_{23} \end{bmatrix},$$

$$J_{21} = \begin{bmatrix} 0 & -s_1 & -s_1 \\ 0 & -c_1 & -c_1 \\ 1 & 0 & 0 \end{bmatrix}, J_{22} = \begin{bmatrix} c_1 s_{23} & -c_1 c_{23} s_4 - s_1 c_4 & c_1 c_4 c_{23} s_5 - s_1 s_4 s_5 + c_1 s_{23} c_5 \\ s_1 s_{23} & -s_1 c_{23} s_4 - c_1 c_4 & s_1 c_4 c_{23} s_5 + c_1 s_4 s_5 + s_1 s_{23} c_5 \\ c_{23} & s_{23} s_4 & c_{23} c_5 - s_{23} c_4 s_5 \end{bmatrix},$$

$$e_i = c_1(c_{23} c_4 s_5 + s_{23} c_5) - s_1 s_4 s_5,$$
$$e_j = s_1(c_{23} c_4 s_5 + s_{23} c_5) + c_1 s_4 s_5,$$
$$e_k = c_{23} c_5 - s_{23} c_4 s_5.$$

such that $s_i$ and $c_i$ stand for $\sin(q_i)$ and $\cos(q_i)$, respectively, and $a_2, a_3, d_2, d_4$ are indicative of robot joint parameters. Since $\Psi$ and $U$ are not singular, the singularity analysis can be obtained by checking $J_w$. Further assessment of $J_w$ reveals that $J_{11}$ involves only $q_1, q_2, q_3$ which correspond to the arm joints and $J_{22}$ involves only $q_4, q_5, q_6$ which correspond to the wrist joints. Singular configurations caused by $J_{11}=0$ are called arm singularities and singular configurations caused by $J_{22}=0$ are called wrist singularities.

Since the determinant of $J_{11}$ is $(d_4 \dot{c}_3 - a_3 s_3)(d_4 s_{23} + a_2 c_2 + a_3 c_{23})$, two singular configurations can with the arm joints. A boundary singular configuration occurs when $\gamma_b = d_4 c_3 - a_3 s_3 = 0$. This situation occurs when the elbow is fully extended or retracted. An interior singular configuration occurs when $$\gamma_i = d_4 s_{23} + a_2 c_2 + a_3 c_{23} = 0.$$

On the other hand, a wrist singularity can be identified by checking the determinant of the matrix $J_{22}$. The wrist singularity occurs when two wrist joint axes are collinear. The corresponding singularity condition is denoted by $\gamma_w = -s_5 = 0$.

Each singular condition corresponds to certain robot configurations in the workspace of the robot. The workspace of a robot is a complex volume calculated from the limit values of the joint variables. The workspace can be described by two concepts: reachable workspace and dexterous workspace. A reachable workspace is the volume in which every point can be reached by a reference point on the end-effector of the manipulator. The dexterous workspace is a subset of the reachable workspace and it does not include the singular configurations and their vicinities. The dexterous workspace is therefore a volume within which every point can be reached by a reference point on the manipulator's end-effector in any desired orientation.

Unfortunately, the dexterous workspace is not a connected space. It is separated into subspaces by the singular configurations. For example, the wrist singularity condition can be satisfied at almost any end-effector position. In the other word, almost at any point of the workspace, there is an orientation of the end-effector which will lead to the wrist singularity condition. A robot path may compose several segments in the dexterous subspaces as well as one or more segments in the vicinity of a singular configuration. In the dexterous subspaces, there is no problem to control the robot at task level. However, when the robot task requires the robot to go from one dexterous subspace to another dexterous subspace, the end-effector needs to go through the vicinity of a singular configuration. At these configurations, the manipulator loses one or more degrees of freedom and the determinant of $J_o$ approaches zero. In task space, impractically high joint velocities are required to generate a reasonable motion. Thus, it is desirable to provide a hybrid robot motion control system to achieve a stable and continuous motion in the entire workspace.

Figure 2:
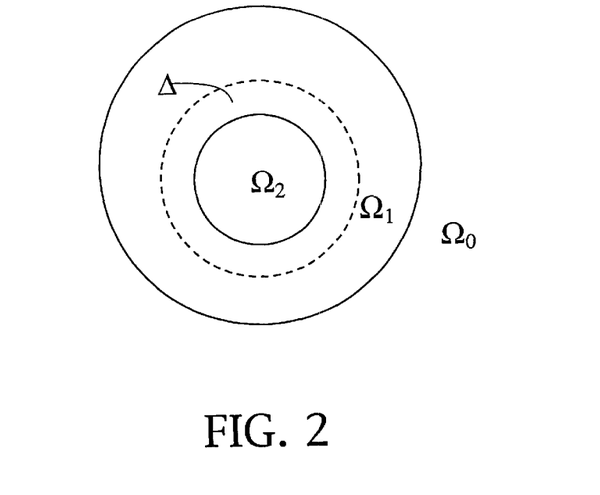
FIG. 2 is a diagram illustrating an exemplary robot workspace about a singular configuration in accordance with the present invention.

To design such a hybrid motion control system, the robot workspace, $\Omega$, can be divided into two kinds of subspaces: the dexterous subspace, $\Omega_0$ and the subspaces in the vicinity of singular configurations as denoted by $\Omega_1$ and $\Omega_2$. The definition of $\Omega_1$ and $\Omega_2$ are given as follows:

$$\Omega_1 = \{q \in R^6 | \alpha_b \leq |\gamma_b| \leq \beta_b \cup \alpha_i | \gamma_i| \leq |\gamma_w \beta_i \cup \alpha_w \leq |\gamma_w| \leq \beta_w\}$$

$$\Omega_2 = \{q \in R^6 | |\gamma_b| < \alpha_b \cup |\gamma_i| < \alpha_i \cup |\gamma_w| < \alpha_w\}$$

where $\beta_b > \alpha_b > 0, \beta_i > \alpha_i > 0, \beta_w > \alpha_w > 0$. In other words, the subspace denoted by $\Omega_2$ is an area closer in proximity to the singular configuration than the subspace denoted by $\Omega_1$. An exemplary robot workspace in the vicinity of a singular configuration, including each of the described subspaces, is shown in FIG. 2. It is worth noting that $\Omega_0 \cup \Omega_1 \cup \Omega_2 = \Omega$ and $\Omega_0 \cap \Omega_1 \cap \Omega_2 = \phi$. addition, a region, $\delta$, called the dwell region is defined in $\Omega_1$. The dwell region may be defined as $$\Delta = \{q \in R^6 | \alpha_i < |\gamma_i| < \alpha_i + \delta \text{ and/or } \alpha_b < |\gamma_b| < \alpha_b + \delta \text{ and/or } \alpha_w < |\gamma_w| < \alpha_w + \delta\},$$ where $\delta$ is a constant greater than zero. As will be further described below, the dwell region is used to avoid chattering when switching occurs between the subspaces.

In subspace $\Omega_0$, the inverse of $J_o$ always exists and thus the task level controller is effective in this subspace. In region $\Omega_1$, det $J_o$ is very small, and yet a feasible solution of the inverse Jacobian can be obtained by using a pseudo-inverse Jacobian matrix. As will be further described below, the task level controller can still be used after substituting $J_o^\#$ for $J_o^{-1}$, where $J_o^\#$ is a kind of pseudo-inverse Jacobian matrix. However, as is known in the art, the task level controller based on pseudo-inverse Jacobian matrix will cause instability in subspace $\Omega_2$. If a robot motion controller can not make the robot go through singular subspace $\Omega_2$, the singular configurations greatly restricts the dexterous workspace of the robot. Since the joint level controller works in the whole workspace, it can be used to maintain system stability and smooth trajectory in subspace $\Omega_2$. In accordance with the present invention, the hybrid control system employs different controllers in different subspaces in order to achieve stable and continuous robot motion in the entire workspace.

A hybrid motion control system involves continuous and discrete dynamic systems. The evolution of such a system is given by equations of motion that generally depend on both continuous and discrete variables. The continuous dynamics of such a system is generally modeled by several sets of differential or difference equations; whereas the discrete dynamics describes the switching logic of the continuous dynamics. Thus, the task level controller and the joint level controller are the continuous controllers and the singularity conditions serves as the discrete switching conditions between these continuous controllers.

A general form of the hybrid robot motion controller is defined as follows. The continuous state variable is either joint angle, q, or the end-effector position and orientation, Y. The discrete state variables, denoted by $m \in \mathfrak{R}^1$ or $m \in \{m_1, m_2, \ldots m_1\}$, represent the closeness to a singular configuration. The hybrid control system model of the robot can be described by $$D(q)\ddot{q} + C(q,\dot{q}) + g(q) = u$$

$$DJ_o^{-1}(\ddot{Y} - \dot{J}_o \dot{q}) + c(q,\dot{q}) + g(q) = u$$

$$m(t) = f(Y(t), q(t), m(t^-))$$

and the hybrid robot motion controller is given by $$u(t) = f(Y(t), q(t), m(t)).$$

The dynamics, f, is governed by the singularity conditions. Depending on the current discrete state and the continuous states of the robot, f gives the next discrete state. $t^-$ denotes that m(t) is piecewise continuous from the right. f discretizes the continuous states and switches between local controllers. h(t) integrates the task level controller, the joint level controller and the discrete state m(t). As will be further described below, Max-Plus algebra is used to describe the discrete event evolution. It can provide an analytical representation of a discrete event system.

In subspace $\Omega_1$, the robot is in the neighborhood of singular configurations where the direct inverse of the Jacobian matrix will result in large torques. Therefore, the hybrid motion control system of the present invention uses a modified task level controller in this subspace. In particular, the modified task level controller employs a pseudoinverse Jacobian matrix which is computed using a damped least squares technique. A more detailed description of the modified task level controller is provided below.

The inverse Jacobian $J_o^{-1}$ can be decomposed into $$J_o^{-1} = J_w^{-1} \cdot \begin{bmatrix} I & 0 \\ 0 & \Psi \end{bmatrix}^{-1} \cdot \begin{bmatrix} I & U \\ 0 & I \end{bmatrix}^{-1},$$

where $$J_w = \begin{bmatrix} J_{11} & 0 \\ J_{21} & J_{22} \end{bmatrix}.$$

In the neighborhood of singular configurations, $J_w$ is ill-conditioned. However, the inverse of $J_w$ can be computed using a damped least squares technique, thereby yielding $$J_w^{\#} = (J_w \cdot J_w^T + m_{s1}(t))^{-1} \cdot J_w^T, \quad (1.4)$$

where $m_{s1}(t)$ is a matrix of variable damping factors. The inverse of $J_o$ that is based on $J_w^{\#}$ is called $J_o^{\#}$.

$m_{s1}$ defines the switching conditions for the task level controller. It is a function of the singularity conditions and can be represented by Max-plus algerbra. More specifically, the Max-Plus algebra is defined as $m(t) \in \mathfrak{R}_{max}^n$, where $\mathfrak{R}_{max} = \mathfrak{R} \cup \{-\infty\}$, $\oplus$: max operation, and $\otimes$: plus operation. Some exemplary opperations may include (but are not limited to) $a \oplus b = \max\{a,b\}$ and $a \otimes b = a+b$. It can be shown that $\{\mathfrak{R}_{max}": \oplus \otimes\}$ is an idempotent and commutative semifield with zero element $\alpha = -\infty$ and identity element $e = 0$.

Based on the analysis of the inverse of $J_w$, $m_{s1}$ is defined as follows:

$$m_{s1}(t) = \text{diag}([m_1(t) m_2(t) m_3(t) m_4(t) m_5(t) m_6(t)])$$

$$= \begin{bmatrix} k_i \oplus 0 & 0 & 0 & 0 & 0 & 0 \\ 0 & k_i \oplus k_b \oplus 0 & 0 & 0 & 0 & 0 \\ 0 & 0 & k_b \oplus 0 & 0 & 0 & 0 \\ 0 & 0 & 0 & k_w \oplus 0 & 0 & 0 \\ 0 & 0 & 0 & 0 & 0 & 0 \\ 0 & 0 & 0 & 0 & 0 & k_w \oplus 0 \end{bmatrix}$$

where $k_b = k_{b0}(1 - |\gamma_b|/\beta_b)$, $k_i = k_{i0}(1 - |\gamma_i|/\beta_i)$, and $k_w = k_{w0}(1 - |\gamma_w|/\beta_w)$. In other words $m_{s1}(t)$ is a matrix of positive damping factors which depend on the closeness to the singular configurations. Diag(v) denotes a matrix whose diagonal elements are vector, v, and the remaining elements are zeroes. At a dexterous configuration, the diagonal elements of $m_{s1}$ are zeroes. In the vicinity of singularity conditions, some of the elements are nonzeroes and some of the elements are zeroes depending on the particular singularity condition. Accordingly, the task level controller of the hybrid control system can be synthesized by $$u_3 = DJ_o^{\#}(\ddot{Y}^d + J_o \dot{q} + K_{Vx} e_{x2} + K_{Px} e_{x1}) + c + g \quad (1.5)$$

A stability analysis for the modified task level controller is presented below. By substituting equation (1.5) into equation (1.2) and defining $e_{x1} = Y^d - Y$ and $e_{x2} = \dot{Y}^d - \dot{Y}$, the error dynamic for the task level controller can be described by:

$$\dot{e}_{x1} = e_{x2}$$

$$\dot{e}_{x2} = (I - J_o J_o^{\#})(\ddot{Y}^d - \dot{J}\dot{q}) - J_o J_o^{\#}(K_{Px} e_{x1} + K_{Vx} e_{x2})$$

To analyze the stability of this system, the term $J_o J_o^{\#}$ is a key component. It can be simplified by the singular value decomposition (SVD) of Jacobian matrix, $J_w$, as follows $$J_w = \sum_{i=1}^{6} \sigma_i u_i v_i^T = U \cdot \sum_1 \cdot V^T.$$

Therefore, equation (1.4) can be expressed by $$J_w^{\#} = \sum_{i=1}^{6} \frac{\sigma_i}{\sigma_i^2 + m_i} v_i u_i^T = V^T \cdot \sum_2 \cdot U$$

where $v_i, u_i, i=1, \ldots, 6$ are orthonormal basis of $IR^6$; $\sigma_i, i=1, \ldots, 6$ are the singular values of $J_w$; U and V are orthonormal matrices; and $\Sigma_i, i=1,2$ are diagonal. $J_o J_o^{\#}$ can then be simplified as follows:

$$k = J_o J_o^{\#}$$

$$= \text{diag}\left[\frac{\sigma_1^2}{\sigma_1^2 + m_1} \frac{\sigma_2^2}{\sigma_2^2 + m_2} \frac{\sigma_3^2}{\sigma_3^2 + m_3} \frac{\sigma_4^2}{\sigma_4^2 + m_4} \frac{\sigma_5^2}{\sigma_5^2 + m_5} \frac{\sigma_6^2}{\sigma_6^2 + m_6}\right]$$

By defining $$k_{\min} = \min_{i=1}^{6}\left\{\frac{\sigma_i^2}{\sigma_i^2 + m_i}\right\},$$

it can be seen that $k_{min}$ becomes smaller and smaller when the robot configuration is approaching a singular point. The stability of controller in subspace $\Omega_0$ and $\Omega_1$ will depend on k. In subspace $\Omega_0$, k=I, the error dynamics in region $\Omega_0$ becomes $$\dot{e}_{x1} = e_{x2}$$

$$\dot{e}_{x2} = -K_{Px} e_{x1} - K_{Vx} e_{x2} \quad (1.6)$$

Accordingly, the modified task level controller is asymptotically stable in subspace $\Omega_0$ for appropriate gain matrices.

While in subspace $\Omega_1$, the error dynamics of the system can be described by $$\dot{e}_{x1} = e_{x2}$$

$$\dot{e}_{x2} = (I-k)(\ddot{Y}^d - \dot{J}\dot{q}) - k(K_{Px} e_{x1} + K_{Vx} e_{x2})$$

Defining the candidate Lyapunov function of equation (1.6) as $$V = \tfrac{1}{2}[e_{x1}^T K e_{x1} + (\mu e_{x1} + e_{x2})^T (\mu e_{x1} + e_{x2})]$$

where K is positive definite matrix and $\mu$ is positive constant. The derivative of the candidate Lyapunov Function can be derived by $$\dot{V} = e_{x1}^T K e_{x2} + (\mu e_{x1} + e_{x2})^T$$

$$(\mu e_{x2} + (I-k)(\ddot{Y}^d - \dot{J}\dot{q}) -$$

$$k(K_{Px} e_{x1} - K_{Vx} e_{x2})) = -\mu e_{x1}^T k K_{Px} e_{x1} -$$

$$e_{x2}^T (k K_{Vx} - \mu I) e_{x2} + (\mu e_{x1} + e_{x2})^T$$

$$(I-k)(\ddot{Y}^d - \dot{J}\dot{q}) \leq -\mu e_{x1}^T k_{min} K_{Px} e_{x1} -$$

$$e_{x2}^T (k_{min} K_{Vx} - \mu I) e_{x2} + (1 - k_{min}) \cdot \|e_x\| \eta \sqrt{1 + \mu^2} =$$

$$-k_{min}\lambda_{min}\|e_x\|+(1-k_{min})\cdot\|e_x\|\eta\sqrt{1+\mu^2}=-$$

$$(k_{min}\lambda_{min}-(1-k_{min})\cdot\eta\sqrt{1+\mu^2})\|e_x\|$$

where $K=K_{Px}+\mu K_{Vx}-\mu^2 I$ and $\mu$ is chosen such that $K_{Vx}-\mu I$ and $K$ are positive definite. $\lambda_{min}$ is the minimum singular value of $\mu K_{Px}$ and $K_{Vx}-\mu I/K_{min}$, which is positive. $\eta$ is the bound of $\ddot{y}^d-J\dot{q}$. From the above derivation, it can be seen that the stability depends on the value of $k_{min}$. In subspace $\Omega_0$, $k_{min}=1$, $\dot{V}$ is the negative definite and the system is asymptotically stable. In subspace $\Omega_1$, $k_{min}\lambda_{min}-(1-k_{min})\cdot\eta\sqrt{1+\mu^2}>0$, the system is still asymptotically stable. However, in subspace $\Omega_2$, the value of $k_{min}$ is close to zero, $k_{min}\lambda_{min}-(1-k_{min})\cdot\eta\sqrt{1+\mu^2}\leq 0$, such that system stability can not be ensured.

In region $\Omega_2$, two observations can be made from the error dynamics. First, at the singular points, because some singular values in $\Sigma_2$ are zeros, the corresponding gains in gain matrices become zeroes. Assuming $\sigma_i$ is zero, the $i^{th}$ element of the simplified Jacobian matrix $J_w$ can be written as:

$$\dot{e}_{x1i}=e_{x2i}$$

$$\dot{e}_{x2i}=\ddot{Y}_i^d-(J\dot{q})_i$$

Thus, it can be seen that the system is an open loop system. Though it can be proven the system is ultimately bounded, big errors in the task space are expected when the measurement of the singular conditions are small enough. When a wrist singularity is met, the errors of O,A,T angles are very big. Accompanied with the errors in task space, large joint velocities are experienced which are unacceptable in most applications.

Second, when the robot approaches close to singular configurations, such as in region $\Omega_2$, some of the elements of k become very small and the corresponding elements of the gain matrices also become small. Though the system is stable at this region, large task error is expected and output torque is reduced in certain directions.

To achieve a stable control in region $\Omega_2$, a switching control is needed such that a joint level control can be enabled in $\Omega_2$. Two discrete variables, $m_7$ and $m_8$, are defined to represent arm and wrist singularities, respectively, $$(m_7(t)=m_7(t^-)^{sgn(\alpha_i+\delta-\gamma_b)\oplus sgn(\alpha_b+\delta-\gamma_b)\oplus 0}\oplus sgn((\alpha_i-\gamma_i)\oplus sgn((\alpha_b-\gamma_b)\oplus 0$$

$$m_8(t)=m_8(t^-)^{sgn(\alpha_i+\delta-\gamma_w)\oplus 0}\oplus sgn(\alpha_w-\gamma_w)\oplus 0.$$

where, $m_7(t^-)$ and $m_8(t^-)$ represent the values of $m_7$ and $m_8$ before a time instances t, respectively, and $\alpha_i,\alpha_b,\alpha_w$ specify subspace $\Omega_2$. Depending on the values of $\gamma_b,\gamma_i$, and $\gamma_w$, $m_7$ and $m_8$ will determine which of the continuous controllers should be used in the hybrid control system. It is worth noting that in the dwell region, $\Delta$, the values of $m_7$ and $m_8$ not only depend on $\gamma_b,\gamma_i$ and $\gamma_w$, but also depend on the previous value of $m_7(t^-)$ and $m_8(t^-)$. The dwell region, $\Delta$, is introduced to avoid chattering in the switching surface. In other words, the switching surface for switching into joint level control and switching out of a joint level control is different. After the controller switches into joint space control, it can not switch back to task space control unless the robot reaches a larger region. This strategy can effectively avoid chattering.

A switching matrix, $m_{s2}$, is based on $m_7$ and $m_8$, as follows:

$$m_{s2}(t)=\begin{bmatrix} m_7(t)I_{3\times 3} & 0 \\ 0 & (m_7(t)\oplus m_8(t))I_{3\times 3} \end{bmatrix}.$$

This switching matrix is then used to form a hybrid motion control system.

In summary, the hybrid motion control system of the present invention can be represented by $$u=(I-m_{s2})u_1+m_{s2}u_3$$

Figure 3:
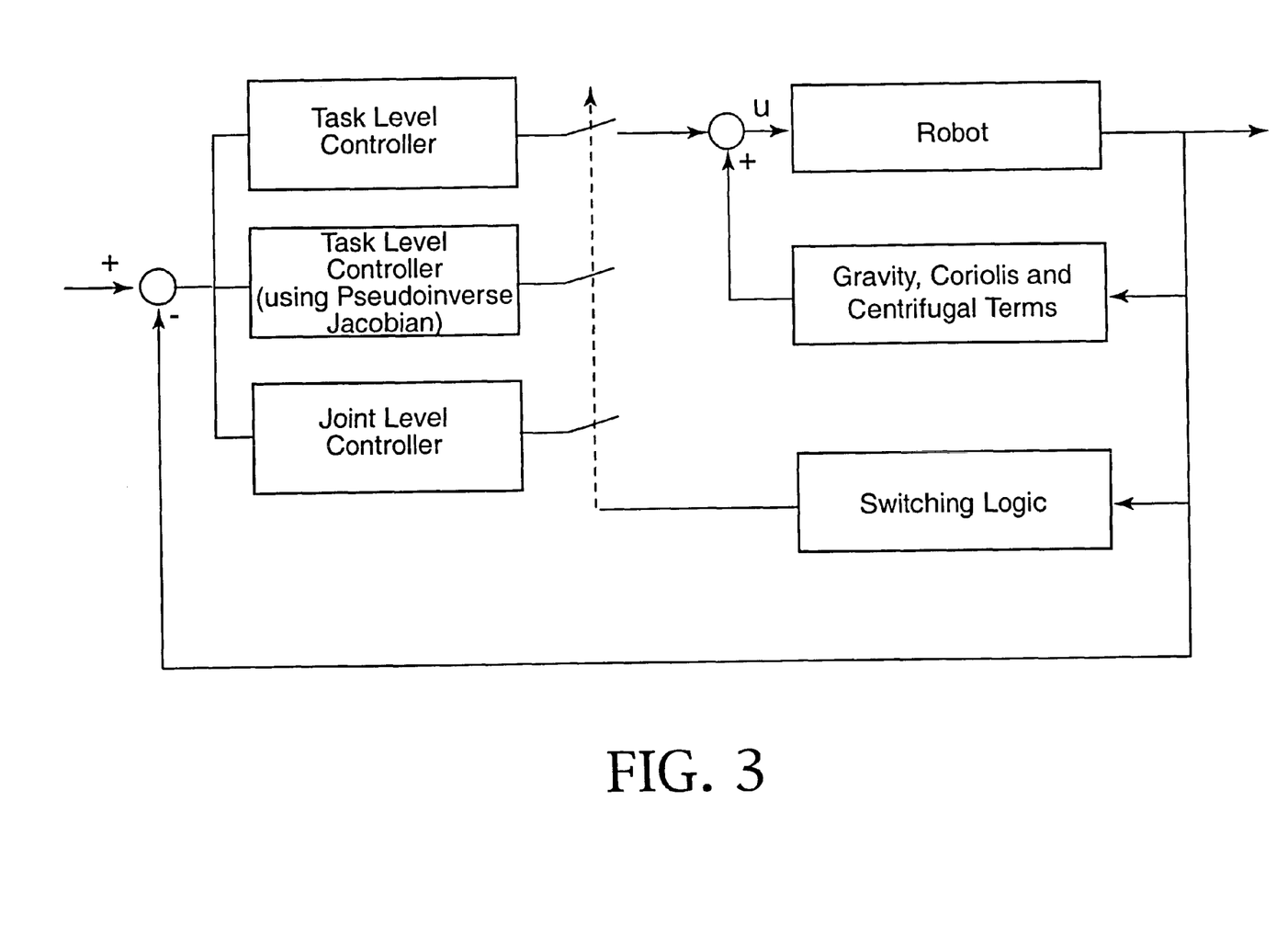
FIG. 3 is a block diagram of a first preferred embodiment of the hybrid motion control system of the present invention.

The system involves both continuous controllers and switching controls as shown in FIG. 3. In operation, the switching conditions are dependent on the closeness to the singular configurations and the previous controller status. When the robot approaches a singular configuration, the hybrid motion control system first uses damped least squares to achieve an approximate motion of the end-effector. The hybrid motion control system will then switch into joint level control if the robot reaches the singular configurations.

It is worth noting that the joint level control and task level control can coexist. This happens when $m_7=0$ and $m_8=1$. It means that the position is controlled at task level and the orientation is controlled at joint level. For a given task, $Y^d=\{x^d,y^d,z^d,O^d,A^d,T^d\}$, the desired position at the wrist center, denoted by $\{p_x^d,p_y^d,p_z^d\}$, can be obtained and taken as the desired value in the position control at task level. The orientation control will be obtained by controlling $q_4,q_5,q_6$ at joint level. The end-effector position and orientation can therefore be controlled separately. Control in task level and joint level will coexist in this situation. Since the wrist singular configuration may happen at almost any end-effector position, the separated position control and orientation control can ensure a relatively larger continuous dexterous workspace for position control.

In subspaces $\Omega_0$ and $\Omega_1$, the robot task is represented in Cartesian space. In region $\Omega_2$. however, the robot task needs to be transformed into joint space. Given $Y^d$ in task space, joint level command $q^d$ needs to be calculated in subspace $\Omega_2$. As will be apparent to one skilled in the art, the normal form approach and equivalence transformation can be used to map the task from Cartesian space to joint space at singular configuration. However, the normal form approach is highly computationally intensive.

Alternatively, since region $\Omega_2$ is very small, the desired joint level command $q^d$ can be obtained computationally as follows. At a singular configuration, some of the joint angles can be obtained by inverse kinematics. For example, at a wrist singular configuration, $q_1^d,q_2^d,q_3^d,q_5^d$ can be computed from $Y^d$ by the normal inverse kinematic approach. $q_4^d$ and $q_6^d$ can be obtained computationally considering the current value of $q_4$ and $q_6$. For each singular configuration, only two of the joint commands can not be obtained by inverse kinematics. To compute these joint level commands, the following criteria are considered.

$$\min\{w_1|Y^d-h(q^d)|+w_2|q^d-q|\}q^d$$

$$\min\{|\dot{Y}^d-J\dot{q}^d|\}\dot{q}^d\leq\dot{q}max,\dot{q}^d$$

where $w_1$ and $w_2$ are positive weight factors.

The first constraint minimizes the deviation after the task is mapped into joint space, and tries to find a $q^d$ such that the least joint movement is needed. It is worth noting that not all desired joint level command need to be calculated from the criteria. Only the joint angles that can not be obtained by the inverse kinematics are calculated using the criteria The values of singular conditions $\gamma_b,\gamma_b,\gamma_b$ will determine the joint to be found by the optimization criteria.

The second constraint ensures the planned joint velocities are within the joint velocity limits. The path from q to $q^d$ is planned based on the desired velocity obtained from the second constraints. The continuity of joint velocities and task level velocities are considered in the planning. At joint level, the initial velocity for every joint is the joint velocity prior to switching.

Next, the hybrid motion control system of the present invention is shown to be stable when switching between the task level control and joint level control. The difficulty at proving the stability of the hybrid motion control system lies in that the state variables in the error dynamics in joint space and task space are different. The errors in joint space and task space are defined as $$e_q = \begin{pmatrix} e_{q1} \\ e_{q2} \end{pmatrix} = \begin{pmatrix} q^d - q \\ \dot{q}^d - \dot{q} \end{pmatrix}, \quad e_x = \begin{pmatrix} e_{x1} \\ e_{x2} \end{pmatrix} = \begin{pmatrix} y^d - y \\ \dot{y}^d - \dot{y} \end{pmatrix}.$$

The error dynamics of the manipulator in joint space can be written by $$\dot{e}_{q1} = e_{q2}$$
$$\dot{e}_{q2} = -K_{Pq} e_{q1} - K_{Vq} e_{q2} \quad (2.1)$$

or $\dot{e}_q = f_q(e_q)$. The error dynamic in the task space is $$\dot{e}_{x1} = e_{x2}$$
$$\dot{e}_{x2} = (I-k)(\ddot{y}^d - \dot{J}\dot{q}) - k(K_{Px} e_{x1} + K_{Vx} e_{x2}) \quad (2.2)$$

or $\dot{e}_x = f_x(e_x)$. If the system switches between the two different controllers, the stability of the switching system needs to be proven. Since the state variables in error dynamic models are different, the relationship between the state variables in models is derived first.

It is easy to prove that $y=h(q)$ and $\dot{y}=J\dot{q}$ are globally Lipschitz continuous in their defined domain. Thus the following relationship can be obtained $$\|e_{x1}\| = \|y^d - y\| = \|h(q^d) - h(q)\| \leq L_1 \|q^d - q\| = L_1 \|e_{q1}\|$$

$$\|e_{x2}\| = \|\dot{y}^d - \dot{y}\| = \|J(q^d)\dot{q}^d - J(q)\dot{q}\| \leq L_2 \|\dot{q}^d - \dot{q}\| = L_2 \|e_{q2}\|$$

where $L_1$ and $L_2$ are constants. In summary, the following relation between joint space error and task space error can be obtained:

$$\|e_x\| \leq L_b \|e_q\|$$

where $L_b$ is constant. Similar to the above inequality, the following relationship can also be obtained based on the Lipschitz continuity of the function $q = h^{-1}(y), \dot{q} = J^{-1}\dot{y}$ in $\Omega_0 \cup \Omega_1$.

$$\|e_q\| \leq L_a \|e_x\|$$

Therefore, the errors in joint space and task space satisfy the following inequality in $\Omega_0 \cup \Omega_1$.

$$\|e_q\| \leq L_a \|e_x\|, \|e_x\| \leq L_b \|e_q\|$$

Defining the Lyapunov function of system (2.1) and system (2.2) as $$V_1 = \frac{1}{2}(e_{q1}^T K_{Pq} e_{q1} + e_{q2}^T e_{q2})$$

$$V_2 = \frac{1}{2}[e_{x1}^T K e_{x1} + (\mu e_{x1} + e_{x2})^T (\mu e_{x1} + e_{x2})].$$

Since the system (2.1) and (2.2) have been proven to be stable individually, the Lyapunov functions satisfy the inequalities $$a_1 \|e_q\| \leq V_1(e_q) \leq b_1 \|e_q\|$$

$$\frac{\partial V_1(e_q)}{\partial x} f_q(e_q) \leq -c_1 \|e_q\|$$

$$a_2 \|e_x\| \leq V_2(e_x) \leq b_2 \|e_x\|$$

$$\frac{\partial V_2(e_x)}{\partial x} f_x(e_x) \leq -c_2 \|e_x\|$$

For an initial time $t_0$ the following inequalities can be obtained.

$$V_1(e_q(t_0 + \tau)) \leq e^{-\lambda_1 \tau_1} V_1(e_q(t_0))$$
$$V_2(e_x(t_0 + \tau)) \leq e^{-\lambda_2 \tau_2} V_2(e_q(t_0))$$

where $\lambda_1 c_1/b_1, \lambda_2 = c_2/b_2$ are positive scalars. Having set forth the above equalities, the characteristic of the Lyapunov function under switching can be studied.

Figure 4:
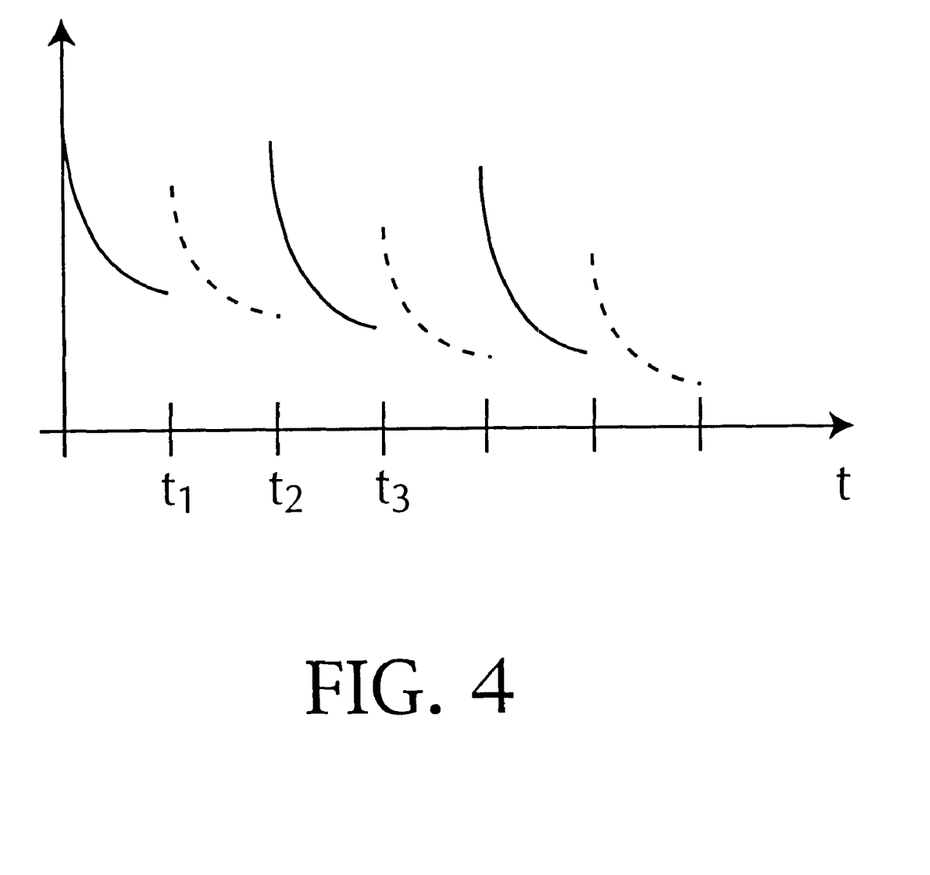
FIG. 4 illustrates a typical switching sequence for the hybrid control system of the present invention.

In order to prove the hybrid control system is stable, it is essential to show that $V_1$ is monotone decreasing at all odd number of switch instances, $t_1, t_3, t_5 \ldots$, and $V_2$ is monotone decreasing at all even switching instances, $t_0, t_2, t_4, \ldots$. A typical switching sequence for the hybrid control system is shown in FIG. 4. Based on this switching sequence, $$V_1(e_q(t_1)) \leq b_1 \|e_q(t_1)\| \leq b_1 L_a \|e_x(t_1)\|$$
$$\leq \frac{b_1 L_a}{a_2} V_2(e_x(t_1)) \leq \frac{b_1 L_a}{a_2} e^{-\lambda_2(t_1 - t_0)} V_2(e_x(t_0))$$

$$V_2(e_x(t_2)) \leq b_2 \|e_x(t_2)\| \leq b_2 L_b \|e_q(t_2)\|$$
$$\leq \frac{b_2 L_b}{a_1} V_1(e_q(t_2)) \leq \frac{b_2 L_b}{a_1} e^{-\lambda_1(t_2 - t_1)} V_1(e_q(t_1))$$
$$\leq \frac{b_2 L_b}{a_1} \frac{b_1 L_a}{a_2} e^{-\lambda_1(t_2 - t_1)} e^{-\lambda_2(t_1 - t_0)} V_2(e_x(t_0))$$

From the above equalities, it can be seen that $$V_2(e_x(t_2)) \leq \frac{b_2 L_b}{a_1} \frac{b_1 L_a}{a_2} e^{-\lambda_1(t_2 - t_1)} e^{-\lambda_2(t_1 - t_0)} V_2(e_x(t_0))$$

The values of $\lambda_1$ and $\lambda_2$ are related to the gain matrices $K_{px}, K_{vx}, K_{pq}$ and $K_{vq}$. The gain matrices can be selected such that $V_2(e_x(t_2)) < V_2(e_x(t_0))$. Accordingly, the switched system can be proven to be asymptotically stable as is known in the art. In the implementation of the controller, height gains and sampling frequency are chosen to ensure appropriate $\lambda_1, \lambda_2$. The role of $\delta$ is to avoid chattering at switching. In accordance with the definition of a Dwell Region, the value of $m_7$ or $m_8$ can not be changed immediately. Only when robot configuration reaches another boundary from the current one can the value of $m_7$ or $m_8$ change. This avoids chattering. From a different point of view, $\delta$ can also be designed to ensure $V_2(e_x(t_2)) < V_2(e_x(t_0))$, thereby ensuring the stability of the switching mechanism.

While the invention has been described in its presently preferred form, it will be understood that the invention is capable of modification without departing from the spirit of the invention as set forth in the appended claims.

What is claimed is:

1. A hybrid control system for controlling the movement of a robot, comprising:

a singularity detector operable to monitor the movement of the robot and detect robot movement in a region about a singularity configuration;

a task level controller connected to the singularity detector, the task level controller receptive of a motion plan and operable to issue a first set of control commands to the robot when robot movement occurs outside said region, where the first set of control commands are defined a task space; and a joint level controller connected to the singularity detector, the joint level controller receptive of the motion plan and operable to issue a second set of control commands to the robot when robot movement occurs inside said region, where the second set of control commands are defined in a joint space.

2. The hybrid control system of claim 1 wherein the robot is operable at the singularity configuration.

3. The hybrid control system of claim 1 wherein the robot includes a manipulator having a plurality of joints and an end-effector, such that the manipulator is operable to position and orientate the end-effector within a reachable workspace.

4. The hybrid control system of claim 3 wherein the singularity detector is operable to monitor robot joint parameters associated with said plurality of joint, such that the robot joint parameters are indicative of robot movement in the region about the singularity configuration.

5. The hybrid control system of claim 3 wherein the manipulator further includes a three degrees of freedom forearm and a three degrees of freedom spherical wrist.

6. The hybrid control system of claim 5 wherein the singularity configuration may be selected from the group consisting of a boundary arm singular configuration, an interior arm singular configuration, and a wrist singularity configuration.

7. The hybrid control system of claim 1 wherein the task level controller is further defined by $$u_2 = DJ_o^{-1}(\ddot{Y}^d - \dot{J}_o\dot{q} + K_{Vx}e_{x2} + K_{Px}e_{x1}) + c(q,\dot{q}) + g(q)$$

where u is a vector of applied torques; q is a vector denoting joint displacements of the robot; D is an inertia matrix for the robot; $J_o$ is a Jacobian matrix which defines the relationship between the joint space and the task space; Y is a vector denoting the position and orientation of the end-effector of the robot in task space; $Y^d, \dot{Y}^d, \ddot{Y}^d$ denotes a desired robot task expressed in task space; $K_{Vx}$ and $K_{Px}$ are feedback gain matrices; $c(q,\dot{q})$ is centripetal and coriolis terms; and g(q) is a gravity term.

8. The hybrid control system of claim 1 wherein the joint level controller is further defined by $$u_1 = D(q)(\ddot{q}^d + K_{Vq}(\dot{q}^d - \dot{q}) + K_{Pq}(q^d - q)) + c(q,\dot{q}) + g(q)$$

where u is a vector of applied torques; q is a vector denoting of joint displacements of the robot; D(q) is an inertia matrix for the robot; $q^d, \dot{q}^d, \ddot{q}^d$ denotes a desired robot task expressed in the joint space; $K_{Vq}$ and $K_{Pq}$ are feedback gain matrices; $c(q,\dot{q})$ is centripetal and coriolis terms; and g(q) is a gravity term.

9. The hybrid control system of claim 1 wherein the task level controller operable to use a pseudoinverse jacobian matrix to determine the first set of control commands along a boundary of said region.

10. A hybrid control system for controlling the movement of a robot manipulator, the manipulator having a plurality of joints and an end-effector, comprising:

a singularity detector operable to detect movement of the manipulator in a first region proximate to a singularity configuration and further operable to detect movement of the manipulator in a second region proximate to the singularity configuration, where the second region is a subset of the first region;

a task level controller connected to the singularity detector, the task level controller receptive of a motion plan and operable to issue a first set of control commands to the manipulator when manipulator movement is outside of the first region, where the first set of control commands are defined in a task space using an inverse Jacobian matrix;

said task level controller further operable to issue a second set of control commands to the manipulator when manipulator movement is inside the first region but outside of the second region, where the second set of control commands are defined in the task space using a pseudoinverse Jacobian matrix; and a joint level controller connected to the singularity detector, the joint level controller receptive of the motion plan and operable to issue a third set of control commands to the manipulator when manipulator movement is inside said second region, where the third set of control commands are defined in a joint space.

11. The hybrid control system of claim 10 wherein the robot manipulator is operable at the singularity configuration.

12. The hybrid control system of claim 10 wherein the singularity detector is operable to monitor joint parameters associated with said plurality of joint, such that the joint parameters are indicative of manipulator movement proximate to the singularity configuration.

13. The hybrid control system of claim 10 wherein the pseudoinverse Jacobian matrix is computed using a damped least squares technique.

14. The hybrid control system of claim 10 wherein the task level controller is further defined by $$u_3 = DJ_o^{\#}(-\ddot{Y}^d + \dot{J}_o\dot{q} + K_{Vx}e_{x2} + K_{Px}e_{x1}) + c + g$$

where u is a vector of applied torques; q is a vector denoting joint displacements of the manipulator; D(q) is an inertia matrix for the manipulator; $J_o$ is a Jacobian matrix which defines the relationship between the joint space and the task space; $J_o^{\#}$ is the pseudoinverse Jacobian matrix; Y is a vector denoting the position and orientation of the end-effector in task space; $Y^d, \dot{Y}^d, \ddot{Y}^d$ denotes a desired robot task expressed in task space; $K_{Vx}$ and $K_{Px}$ are feedback gain matrices; c(q, $\dot{q}$) is centripetal and coriolis terms; and g(q) is a gravity term.

15. The hybrid control system of claim 14 wherein the pseudoinverse Jacobian matrix, $J_o^{\#}$, is further defined as $$J_w^{\#} = (J_w \cdot J_w^T + \cdot m_{s1}(t))^{-1} \cdot J_w^T$$

where $J_w$ is the Jacobian matrix, $J_w^T$ is a modified Jacobian matrix computed in accordance with a damped least squares technique, and $m_{s1}(t)$ is a vector of variable damping factors.

16. The hybrid control system of claim 15 wherein the variable damping factors are defined to be zero when manipulator movement is out side of the first region.

17. The hybrid control system of claim 10 wherein the joint level controller is further defined by $$u_1 = D(q)(\ddot{q}^d + K_{Vq}(\dot{q}^d - \dot{q}) + K_{Pq}(q^d - q)) + c(q,\dot{q}) + g(q)$$

where u is a vector of applied torques; q is a vector denoting of joint displacements of the manipulator; D(q) is an inertia matrix for the manipulator; $q^d, \dot{q}^d, \ddot{q}^d$ denotes a desired robot task expressed in the joint space; $K_{Vq}$ and $K_{Pq}$ are feedback gain matrices; $c(q,\dot{q})$ is centripetal and coriolis terms; and g(q) is a gravity term.

18. A method for controlling the movement of a robot using a hybrid motion control system, comprising the steps of:

provia robot manipulator having a plurality of joints and an end-effector, such that the manipulator is operable to position and orientate the end-effector within a workspace;

monitoring movement of the manipulator;

detecting manipulator movement in a first region proximate to a singularity configuration associated with the manipulator;

issuing a first set of control commands to the manipulator when manipulator movement falls outside of the first region, where the first set of control commands are defined in a task space; and issuing a second set of control commands to the manipulator when manipulator manipulator falls within the first region, where the second set of control commands are defined in a joint space.

19. The method of claim 18 further comprises the step of detecting manipulator movement in a second region proximate to the singularity configuration, where the first region is a subset of the second region.

20. The method of claim 19 wherein the step of issuing a first set of control commands further comprises using an inverse Jacobian matrix to determine the first set of control commands when manipulator movement falls outside of the second region and using a pseudoinverse Jacobian matrix when the manipulator movement falls inside the second region but outside of the first region.

* * * * *

UNITED STATES PATENT AND TRADEMARK OFFICE
CERTIFICATE OF CORRECTION

PATENT NO. : 6,456,901 B1  
DATED : September 24, 2002  
INVENTOR(S) : Ning Xi et al.

Page 1 of 2

It is certified that error appears in the above-identified patent and that said Letters Patent is hereby corrected as shown below:

Title page,
Item [56], OTHER PUBLICATIONS, last reference "Xing" should be -- Ning --.

Column 4,
Line 2, "$Y^d, \dot{Y}^{d}, \ddot{Y}^{d}$" should be -- $Y^d, \dot{Y}^d, \ddot{Y}^d$ --.
Line 8, "$\dot{e}$" should be -- $\dot{e}_{x2}$ --.
Line 41, start a new paragraph and insert -- where --.

Column 5,
Line 6, after "can" insert -- be associated --.
Line 66, before "addition" insert -- In --.

Column 6,
Lines 47, 50, 52, 54 and 56, "f" should be -- $f$ --.

Column 7,
Line 26, delete quotation mark after "$_{max}$".
Line 31, "$\Re_{max}$" should be -- $\Re^n_{max}$ --.
Line 58, "$\ddot{Y}^d$" should be -- $-\ddot{Y}^d$ --.

Column 9,
Line 58, "$m_7(t^-)$ and $m_8(t^-)$" should be -- $m_7(t^{-1})$ and $m_8(t^{-1})$ --.

UNITED STATES PATENT AND TRADEMARK OFFICE
CERTIFICATE OF CORRECTION

PATENT NO. : 6,456,901 B1
DATED : September 24, 2002
INVENTOR(S) : Ning Xi et al.

It is certified that error appears in the above-identified patent and that said Letters Patent is hereby corrected as shown below:

Column 11,
Line 27, "$f_q$" should be -- $f_q$ --.
Line 33, "$f_x$" should be -- $f_x$ --.
Line 53, "J" should be -- $J^{-1}$ --.

Signed and Sealed this

Eighth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,456,901 B1                                              Page 1 of 1
DATED         : September 24, 2002
INVENTOR(S)   : Ning Xi et al.

It is certified that error appears in the above-identified patent and that said Letters Patent is hereby corrected as shown below:

<u>Title page,</u>
Item [73], Assignee, -- Board of Trustees operating Michigan State University, East Lansing, Michigan -- should be shown.

Signed and Sealed this

Twenty-sixth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,456,901 B1 Page 1 of 1
APPLICATION NO. : 09/838894
DATED : April 20, 2002
INVENTOR(S) : Ning Xi et al.

It is certified that error appears in the above-identified patent and that said Letters Patent is hereby corrected as shown below:

Insert the following additional paragraph into the specification at Column 1, Line 3:

--STATEMENT OF GOVERNMENT RIGHTS

This invention was made with government support under grant 9796287, awarded by the National Science Foundation. The government has certain rights in the invention--

Signed and Sealed this

Twenty-third Day of June, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,456,901 B1 | Page 1 of 1 |
| APPLICATION NO. | : 09/838894 | |
| DATED | : September 24, 2002 | |
| INVENTOR(S) | : Ning Xi et al. | |

It is certified that error appears in the above-identified patent and that said Letters Patent is hereby corrected as shown below:

Insert the following additional paragraph into the specification at Column 1, Line 3:

--STATEMENT OF GOVERNMENT RIGHTS

This invention was made with government support under grant 9796287, awarded by the National Science Foundation. The government has certain rights in the invention--

This certificate supersedes the Certificate of Correction issued June 23, 2009.

Signed and Sealed this

Fourth Day of August, 2009

JOHN DOLL
*Acting Director of the United States Patent and Trademark Office*